United States Patent
Sakamura et al.

(10) Patent No.: US 7,975,029 B2
(45) Date of Patent: Jul. 5, 2011

(54) TERMINAL EQUIPMENT

(75) Inventors: Ken Sakamura, Tokyo (JP); Noboru Koshizuka, Musashino (JP); Masayuki Terada, Yokosuka (JP); Kensaku Mori, Yokohama (JP); Kazuhiko Ishii, Yokohama (JP); Sadayuki Hongo, Yokohama (JP)

(73) Assignees: NTT DoCoMo, Inc., Tokyo (JP); The University of Tokyo, Tokyo (JP)

( * ) Notice: Subject to any disclaimer, the term of this patent is extended or adjusted under 35 U.S.C. 154(b) by 1279 days.

(21) Appl. No.: 11/377,354

(22) Filed: Mar. 17, 2006

(65) Prior Publication Data

US 2006/0210078 A1  Sep. 21, 2006

(30) Foreign Application Priority Data

Mar. 18, 2005  (JP) .................. P2005-080266

(51) Int. Cl.
*G06F 15/16* (2006.01)
(52) U.S. Cl. ....................... 709/220; 709/227
(58) Field of Classification Search ............ 379/67.1, 379/88.08, 88.12, 88.22, 88.25, 88.26; 380/240; 709/200–203, 217–227
See application file for complete search history.

(56) References Cited

U.S. PATENT DOCUMENTS

| | | | |
|---|---|---|---|
| 6,212,278 B1 * | 4/2001 | Bacon et al. | 380/240 |
| 6,732,360 B1 | 5/2004 | Seo et al. | |
| 2003/0058802 A1 | 3/2003 | Jones et al. | |

FOREIGN PATENT DOCUMENTS

| | | |
|---|---|---|
| EP | 1 085 444 A2 | 3/2001 |
| EP | 1 148 748 A1 | 10/2001 |
| JP | 2000-132395 | 5/2000 |
| JP | 2002-304791 | 10/2002 |
| JP | 2003-323367 | 11/2003 |
| KR | 2000-0038377 | 7/2000 |

OTHER PUBLICATIONS

Masayuki Terada, et al., "Proposal on Architecture for Distributed IC Card Environment", Information Processing Society of Japan, Symposium Series, vol. 2004, No. 11, Oct. 20, 2004, pp. 289-294 (with English translation).

* cited by examiner

*Primary Examiner* — Moustafa M Meky
(74) *Attorney, Agent, or Firm* — Oblon, Spivak, McClelland, Maier & Neustadt, L.L.P.

(57) ABSTRACT

A Terminal equipment 10 has a message information accepter 12 for accepting message information from terminal program 26, an ID generator 14 for generating a thread ID for identifying the message information, a transmitter 16 for generating a message containing the message information and the thread ID and for transmitting the message to IC card 24, and a receiver 18 for receiving a message from the IC card 24. When the message received from the IC card 24 contains the thread ID inserted in the transmitted message, the message information accepter 12 returns the received message as a return value for the message information to the terminal program 26 and terminates a process attributed to the message information.

5 Claims, 3 Drawing Sheets

TERMINAL EQUIPMENT

BACKGROUND OF THE INVENTION

1. Field of the Invention

The present invention relates to terminal equipment and, more particularly, to terminal equipment adapted for transmission/reception of messages to and from a communication partner (e.g., an IC card).

2. Related Background of the Invention

For example, as disclosed in Document (Terada et al., "Proposal on Architecture for Distributed IC Card Environment," Information Processing Society of Japan, Symposium Series Vol. 2004, No. 11, pp. 289-294, Oct. 20, 2004), there is a proposal on a scheme for implementing transmission/reception of messages between a terminal program and an IC card and thereby letting the terminal program and the IC card operate in collaboration with each other.

In this scheme, the terminal program provides a message (src, dst, mtype, param) to a communication library located in the terminal equipment, and the message is transmitted thereby to the IC card (or to another terminal program). Here the elements src, dst, mtype, and param represent a source ID, a destination ID, a type of the message, and a content of the message, respectively.

SUMMARY OF THE INVENTION

However, the above conventional technology had the following problem. Namely, in the above conventional technology, supposing a situation where the terminal program transmits the message through the communication library to the IC card and thereafter receives another message through the communication library from the IC card, there is no means for discriminating to which transmitted message the received message is a reply. For this reason, even if the terminal program receives, for example, a message of "normal completion of a process" from the communication library, the terminal program has no means for determining which process has normally been completed.

The present invention has been accomplished to solve the above problem and an object of the present invention is therefore to provide a terminal equipment permitting a message source such as a terminal program to acknowledge a correspondence relation between a transmitted message and a received message.

In order to achieve the object, a terminal equipment of the present invention comprises accepting means for accepting message information; generating means for generating identification information for identifying the message information accepted by the accepting means; transmitting means for generating a message containing the message information accepted by the accepting means and the identification information generated by the generating means, and for transmitting the generated message to a communication partner; and receiving means for receiving a message from the communication partner, wherein when the message received by the receiving means contains the identification information generated by the generating means, the accepting means returns the message received by the receiving means, as a return value for the message information identified by the identification information, to a source of the message information, and terminates a process attributed to the message information.

The terminal equipment is configured to generate the transmitted message containing the message information and the identification information, to transmit the transmitted message to the communication partner, and, when the received message contains the foregoing identification information, to return the received message as a return value for the message information to the source of the message information, whereby the message information can be associated with the reply (return value) thereto.

The terminal equipment of the present invention is preferably configured as follows: when a predetermined time has elapsed since acceptance of the message information or since transmission of the message by the transmitting means, the accepting means terminates the process attributed to the message information, without returning the message received by the receiving means, as a return value.

Since the process is terminated without returning the received message as a return value when the predetermined time has elapsed since reception of the message information or since transmission of the message by the transmitting means, it is feasible to avoid such inconvenience that the process cannot be terminated when the received message is not acquired because of a communication error or the like.

The terminal equipment of the present invention may also be configured as follows: the accepting means accepts a time used in detection of a time-out, along with the message information and when the time has elapsed since acceptance of the message information or since transmission of the message by the transmitting means, the accepting means terminates the process attributed to the message information, without returning the message received by the receiving means, as a return value.

Since the process is terminated without returning the received message as a return value when the predetermined time has elapsed since acceptance of the message information or since transmission of the message by the transmitting means, it is feasible to avoid such inconvenience that the process cannot be terminated when the received message is not acquired because of a communication error or the like. Furthermore, since the time used in the detection of a time-out is accepted, the time can be optionally set for each message information.

The terminal equipment of the present invention is preferably configured as follows: the generating means generates the identification information containing an identifier for identifying the source of the message information accepted by the accepting means.

Since the identification information is generated so as to contain the identifier for identifying the source of the message information, the identification information can be readily generated without duplication.

DESCRIPTION OF THE PREFERRED EMBODIMENTS

A terminal equipment as an embodiment of the present invention will be described with reference to the drawings.

First, a configuration of the terminal equipment as the present embodiment will be described.

The terminal equipment of the present embodiment is physically a terminal device provided with a CPU, a memory, an external communication interface, and so on and is, for example, a mobile equipment (cell phone), a PDA, a personal computer, or the like. A variety of programs are stored in the memory of the terminal equipment, and a variety of functions are implemented as the programs are executed by the CPU.

Figure 1:
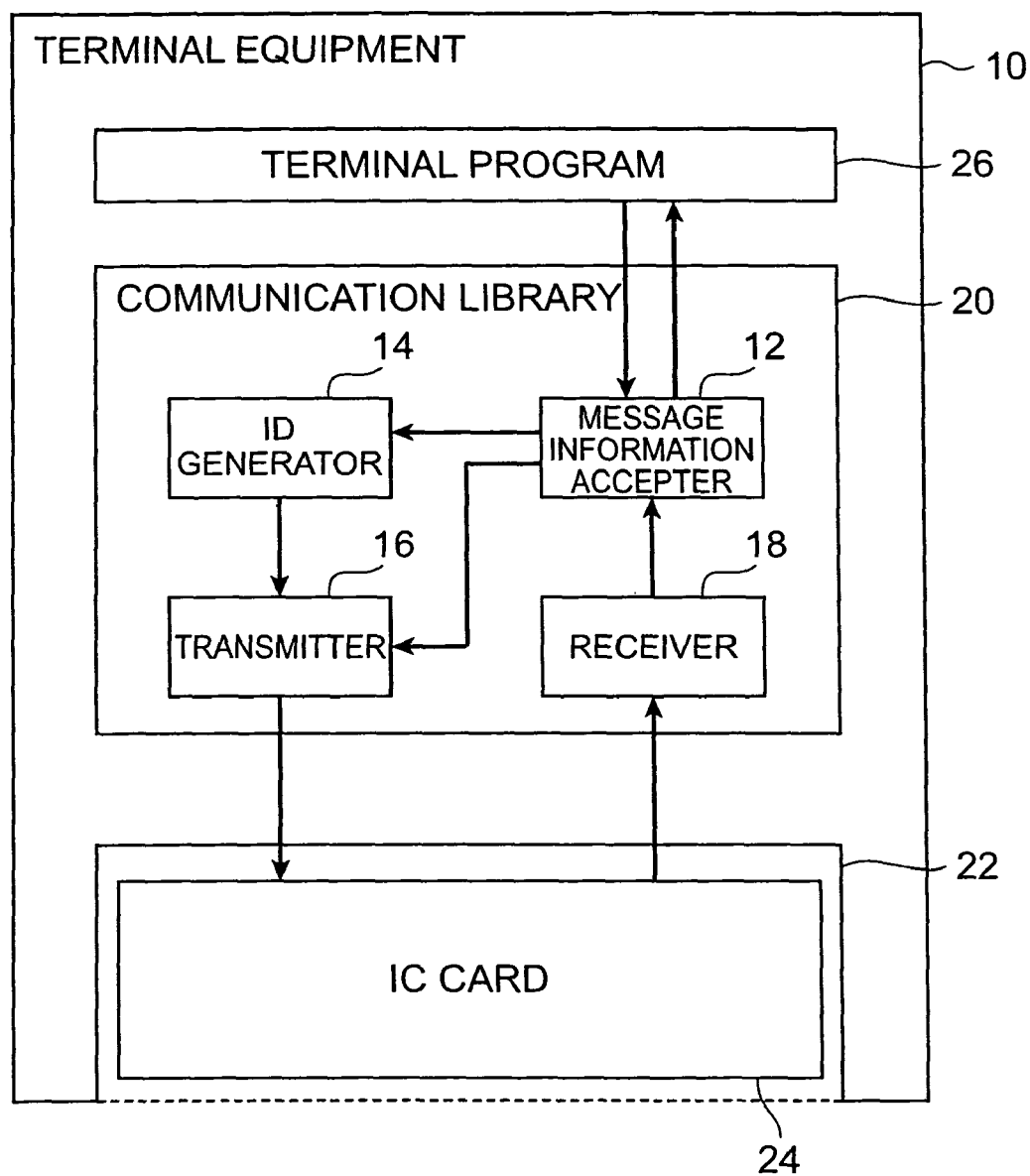
FIG. 1 is a functional configuration diagram of a terminal equipment.

FIG. 1 is a functional configuration diagram of the terminal equipment of the present embodiment. The terminal equipment 10 of the present embodiment, as shown in FIG. 1, is constructed with communication library 20 including message information accepter 12 (accepting means), ID generator 14 (generating means), transmitter 16 (transmitting means), and receiver 18 (receiving means). Furthermore, the terminal equipment 10 is provided with IC card access site 22 (e.g., a slot for insertion of an IC card), and IC card 24 is inserted in the IC card access site 22. The IC card 24 and the terminal equipment 10 are electrically connected to each other so as to be able to transmit and receive data between the transmitter 16 and receiver 18 of the terminal equipment 10, and the IC card 24. Each of the components will be described below in detail.

The communication library 20, as a whole, is a part that executes a procedure for transmission/reception of messages. More specifically, the communication library 20 receives message information from terminal program 26 operating in the terminal equipment 10, performs a transmission/reception process of a message based on the message information, and returns a return value therefor to the source terminal program 26. The components of the communication library 20 will be described below in detail.

The message information accepter 12 receives (or accepts) message information from terminal program 26. The message information contains an ID of the terminal program 26 as a source (hereinafter referred to as a source ID), an ID of a communication partner (e.g., IC card 24) to which the message information is to be transmitted (hereinafter referred to as a destination ID), and a content of a message.

The ID generator 14 generates identification information (hereinafter referred to as a thread ID) for identifying the message information accepted by the message information accepter 12. More specifically, the ID generator 14 generates thread IDs without duplication for mutually different message information pieces received by the message information accepter 12 (such thread IDs generated in this manner will be referred to hereinafter as globally unique thread IDs). For example, a thread ID is a character string as a sequence of a source ID and a serial number managed by the ID generator 14, whereby a globally unique thread ID can be readily generated.

The transmitter 16 generates a message containing the message information accepted by the message information accepter 12 and the thread ID generated by the ID generator 14, and transmits the generated message to the communication partner. More specifically, the transmitter 16 generates a message containing a source ID, a destination ID, a thread ID, and a content of the message, and transmits it to a destination specified by the destination ID. After the transmitter 15 transmits the message to the destination specified by the destination ID, it brings a process or thread (the "thread" stated herein bears no relation with the aforementioned "thread ID" and refers to a thread as a unit of transaction in a general sense) for performing the transmission/reception process of the message, into a rest state.

The receiver 18 receives a message transmitted from the communication partner. When the receiver 18 receives a message, it resumes the process or thread for performing the transmission/reception process of the message (i.e., brings the process or thread from the rest state into an active state). If a plurality of processes or threads for performing the transmission/reception process of message are resting, these may be sequentially resumed or simultaneously resumed.

Furthermore, the message information accepter 12 references the message received by the receiver 18 and confirms whether the message received by the receiver 18 contains the thread ID generated by the ID generator 14 (i.e., the thread ID inserted in the message transmitted from the transmitter 16). When the received message contains the thread ID generated by the ID generator 14, the message information accepter 12 returns the message received by the receiver 18, as a return value for the message information identified by the thread ID, to the source of the message information, and terminates the process attributed to the message information. On the other hand, when the received message does not contain the thread ID generated by the ID generator 14, the message information accepter 12 brings the resumed process or thread again into the rest state. If a plurality of processes or threads for performing the transmission/reception process of message are resting, these processes may be carried out sequentially or simultaneously.

Subsequently, an operation of the terminal equipment of the present embodiment will be described. The operation of the terminal equipment will be described below using an example where the terminal program 26 transmits a message to the IC card 24 and where the IC card 24 returns a message to the terminal program 26. Let a1 be the ID of terminal program 26, i1 be the ID of IC card 24, and m1 be the content of the message transmitted from the terminal program 26 to the IC card 24.

Figure 2:
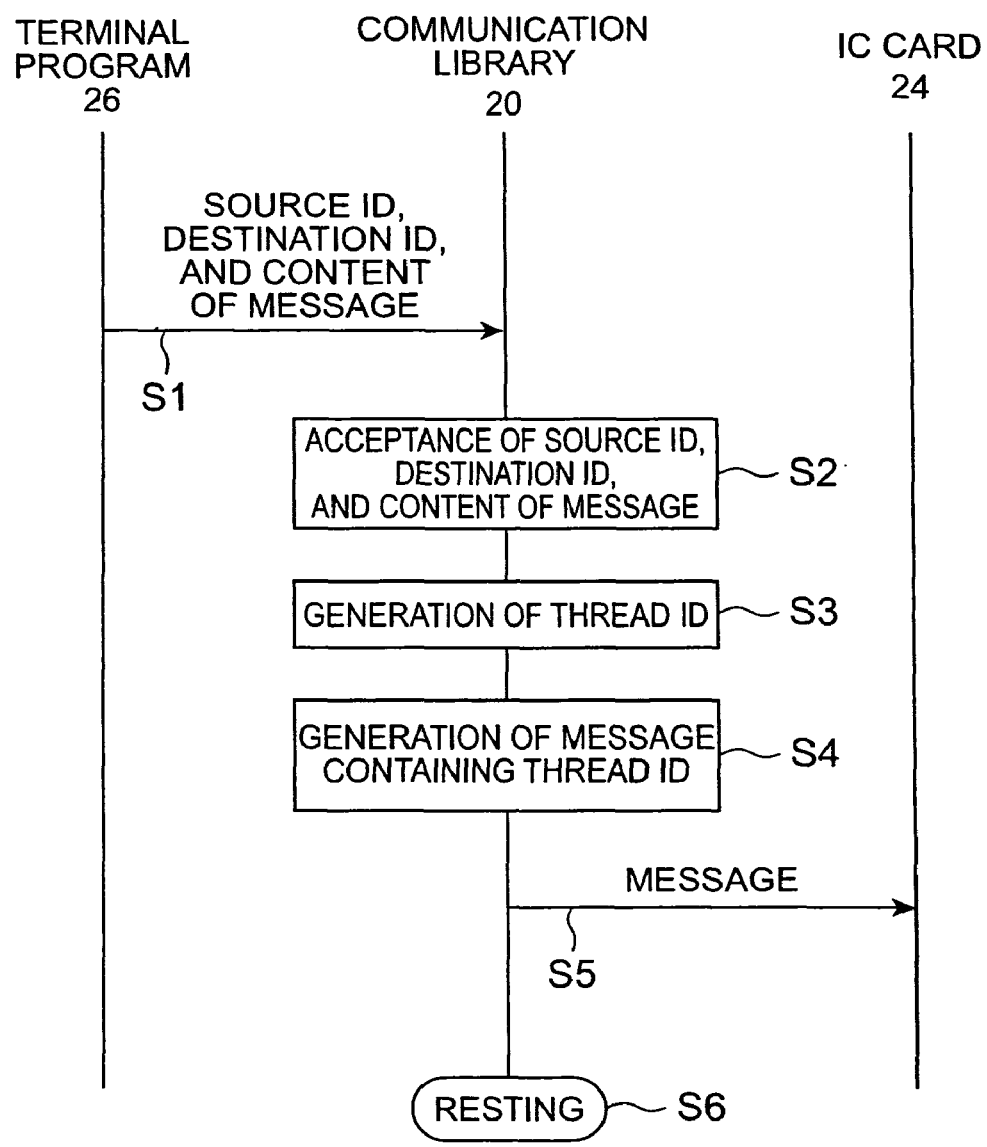
FIG. 2 is a flowchart showing an operation of the terminal equipment in transmission of a message from a terminal program to an IC card.

FIG. 2 is a flowchart showing an operation of the terminal equipment 10 during transmission of the message from terminal program 26 to IC card 24.

For transmission/reception of the message, the terminal program 26 first transmits message information to the communication library 20 (S1). The message information herein contains the source ID (=a1), the destination ID (=i1), and the content of the message (=m1). The message information transmitted from the terminal program 26 is accepted by the message information accepter 12 of the communication library 20 (S2).

When the message information accepter 12 accepts the message information, the ID generator 14 generates a thread ID (S3). The thread ID (=t1) is generated, for example, as a character string (=a1|n) in which the source ID (=a1) and a serial number (=n) managed by the ID generator 14 are sequentially arranged.

Subsequently, the transmitter 16 generates a message containing the message information accepted by the message information accepter 12 and the thread ID generated by the ID generator 14 (S4). More specifically, it generates the message (=<a1, i1, t1, m1>) containing the source ID (=a1), the destination ID (=i1), the thread ID (=t1), and the content of the message (=m1). The generated message is transmitted to the IC card 24 being a destination specified by the destination ID (S5).

After the transmitter 16 transmits the message to the IC card 24, the process or thread for performing the transmission/reception process of the message is brought into the rest state (S6).

Figure 3:
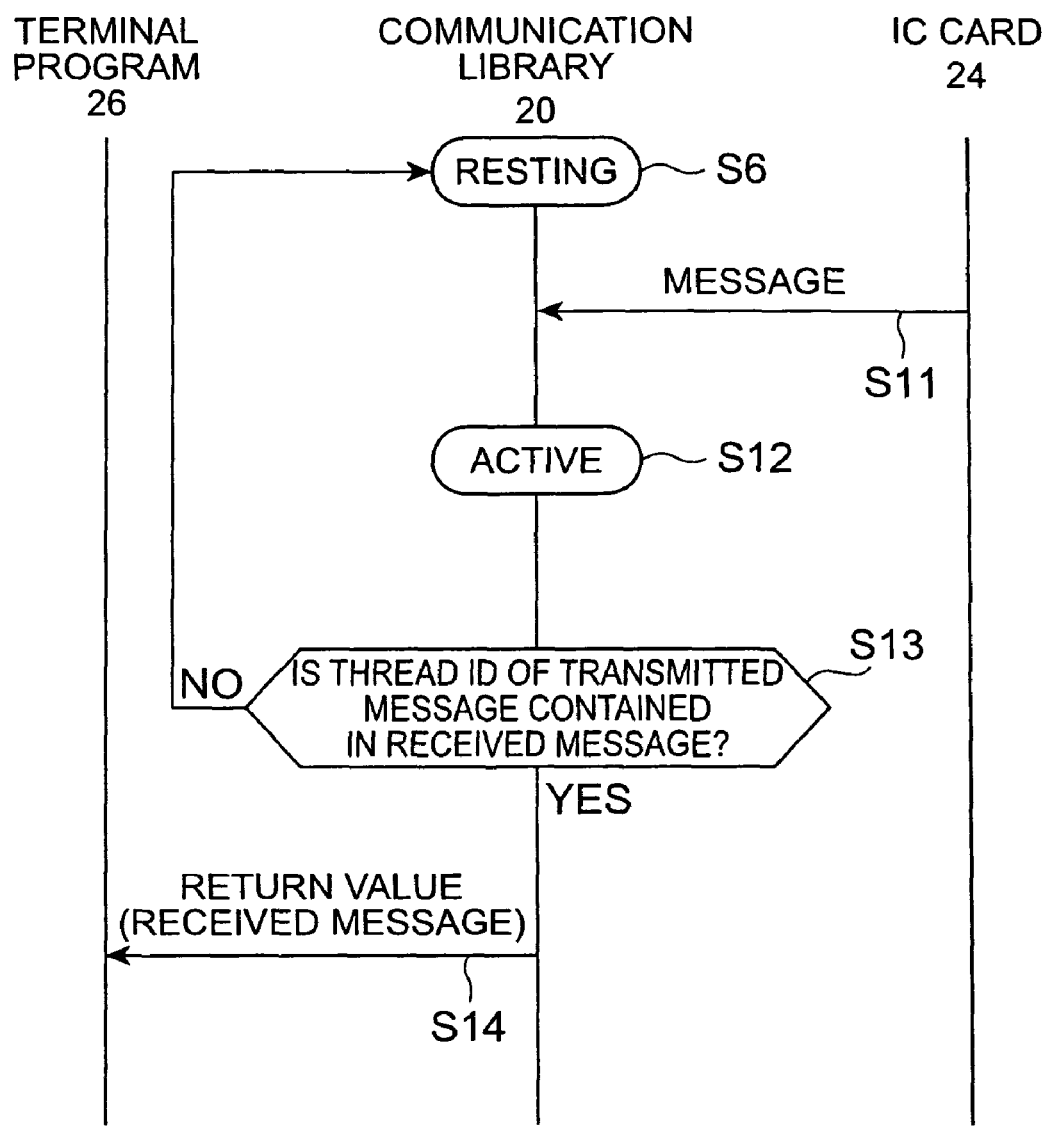
FIG. 3 is a flowchart showing an operation of the terminal equipment in transmission of a message from an IC card to a terminal program.

FIG. 3 is a flowchart showing an operation of the terminal equipment 10 during return of a message from the IC card 24 to the terminal program 26.

After the IC card 24 executes a process (e.g., an addition/subtraction process of an electronic value) according to the message transmitted from the terminal program 26 to the communication library 20, it generates a reply message to the terminal program 26 and transmits it to the communication library 20 (S11). More specifically, the IC card 24 generates a message (=<i1, a1, t1, m2>) containing the source ID (=i1), the destination ID (=a1), the thread ID (=t1), and the content of the message (=m2), and transmits it to the communication library 20. In the message herein, reverse to the message received by the IC card 24, the source ID is the ID of IC card 24 (=i1), and the destination ID is the ID of terminal program 26 (=a1). The thread ID to be included in the message is just the thread ID (=t1) itself included in the message received by the IC card 24. The message transmitted from IC card 24 is received by the receiver 18 of the communication library 20.

When the receiver 18 receives the message, the process or thread for performing the transmission/reception process of the message is resumed (S12).

After that, the message information accepter 12 references the message received by the receiver 18 and confirms whether the thread ID generated by the ID generator 14 (i.e., the thread ID inserted in the transmitted message from the transmitter 16) is contained in the message received by the receiver 18 (S13). When the thread ID is contained in the received message, the message received by the receiver 18 is returned as a return value for the message information identified by the thread ID, to the terminal program 26 being the source of the message information (S14), and the process attributed to the message information is terminated.

On the other hand, when the thread ID generated by the ID generator 14, i.e., the thread ID inserted in the transmitted message from the communication library 20 is not contained in the received message, the process or thread resumed is brought again into the rest state (S15).

Subsequently, the action and effect of the terminal equipment of the present embodiment will be described. The terminal equipment 10 is configured to generate the transmitted message containing the message information and the thread ID, to transmit the transmitted message to the communication partner (e.g., IC card 24), and, when the thread ID is contained in the received message, to return the received message as a return value for the message information to the source of the message information (e.g., terminal program 26). Therefore, the message information can be associated with the reply (return value) thereto. As a result, the message source (e.g., terminal program) is allowed to acknowledge the correspondence relation between the transmitted message and the received message.

In the conventional technology, it was difficult to adopt a communication system based on synchronous call (a communication system of calling a procedure for transmission of a message from the terminal program, thereafter awaiting a reply message without return from the call, and, with reception of the reply message, defining the reply message as a return value, to return from the call), whereas this communication system can be adopted in the terminal equipment 10 of the present embodiment.

The terminal equipment 10 of the present embodiment was configured to accept the source ID from the source and to perform the creation of the thread ID and the creation of the transmitted message using the received source ID, but the equipment may also be arranged as follows. Specifically, a database representing a correspondence relation between each source ID and reference information is preliminarily stored in a memory of the terminal equipment 10, the reference information is received instead of the source ID from the source, the source ID is specified with reference to the database, using the reference information as a key, and the source ID thus specified is used to perform the creation of the thread ID and the creation of the transmitted message.

In the terminal equipment of the above embodiment, there are conceivable cases where the communication library 20 fails to receive a reply message to the transmitted message no matter how long it waits, for some reason, e.g., a case where the transmitted message from the communication library 20 to IC card 24 or the received message transmitted from IC card 24 and received by communication library 20 is lost on the way. Therefore, it is preferable to add a certain time-out process, in order to avoid such inconvenience that the processing cannot be terminated forever, under those situations.

For example, a preferred configuration is such that when a predetermined time has elapsed since acceptance of the message information by the message information accepter 12, the message information accepter 12 returns an error value or the like to the source (i.e., without returning the message received by the receiver 18, as a return value), and terminates the process attributed to the message information. This configuration is to return the error value and to terminate the process with passage of the predetermined time since acceptance of the message information by the message information accepter 12, but another potential configuration is such that when the predetermined time has elapsed since transmission of the message by the transmitter 16, the error value is returned and the process is terminated.

Still another potential configuration is such that the message information accepter 12 accepts a time used in detection of a time-out, along with the message information and, when the time has elapsed since the acceptance of the message information or since the transmission of the message by the transmitter 16, the error value is returned. This configuration permits the time used in detection of a time-out, to be optionally set for each message information.

What is claimed is:

1. A terminal equipment comprising:
   terminal means for generating message information directing a communication partner to execute a process according to the message information, the message information including a source ID;
   accepting means for accepting the message information;
   generating means for generating a thread ID identifying a program process and identification information including at least the thread ID and the source ID for identifying the message information accepted by the accepting means;
   a communication partner access site including an insertion slot that provides a direct electrical connection between the terminal equipment and the communication partner;
   transmitting means for generating a first message containing the message information accepted by the accepting means and the identification information generated by the generating means, and for transmitting the first message to the communication partner; and
   receiving means for receiving a second message from the communication partner based on an execution of the process according to the message information, wherein,
   when the second message received by the receiving means contains the identification information including at least the thread ID and the source ID generated by the generating means,
      the receiving means resumes a process attributed to the message information, and
      the accepting means returns the second message received by the receiving means, as a return value for the message information identified by the identification information including the thread ID and the source ID, to the terminal means, and terminates the process attributed to the message information.

2. The terminal equipment according to claim 1, wherein, when a predetermined time has elapsed since acceptance of the message information or since transmission of the first message by the transmitting means, the accepting means terminates the process attributed to the message information, without returning the second message received by the receiving means, as a return value.

3. The terminal equipment according to claim 1, wherein the accepting means accepts a time used in a detection of a time-out, along with the message information, and, when said time has elapsed since acceptance of the message information or since transmission of the first message by the transmitting means, the accepting means terminates the process attributed to the message information, without returning the second message received by the receiving means, as a return value.

4. The terminal equipment according to claim 1, wherein the identification information generated by the generating means containing an identifier for identifying a source of the message information accepted by the accepting means.

5. A terminal equipment including a communication library associated with an Integrated Circuit (IC) card and a terminal program unit that instructs processes on the IC card via the communication library, comprising:
the terminal program unit to generate message information directing the IC card to execute a process according to the message information, the message information including a source ID;
a communication partner access site including an insertion slot that provides a direct electrical connection between the terminal equipment and the IC card; and
the communication library including
an accepting unit to accept the message information,
an ID generator unit to generate a thread ID identifying a program process executing of the terminal program unit and identification information including at least the thread ID and the source ID for identifying the message information accepted by the accepting unit,
a transmitting unit to generate a first message containing the message information accepted by the accepting unit and the identification information generated by the ID generator unit, and to transmit the first message to the IC card, and
a receiving unit to receive a second message from the IC card based on an execution of the process according to the message information, wherein,
when the second message received by the receiving unit contains the identification information including at least the thread ID and the source ID generated by the generating unit,
the receiving unit resumes a process attributed to the message information, and
the accepting unit returns the second message received by the receiving means, as a return value for the message information identified by the identification information including the thread ID and the source ID, to the terminal program unit, and terminates the process attributed to the message information.

* * * * *